United States Patent [19]

Higa

[11] Patent Number: 4,593,293

[45] Date of Patent: Jun. 3, 1986

[54] X, Y PLOTTER

[75] Inventor: Richard M. Higa, Downey, Calif.

[73] Assignee: Sanders Associates, Inc., Nashua, N.H.

[21] Appl. No.: 536,488

[22] Filed: Sep. 28, 1983

[51] Int. Cl.$^4$ .......................................... G01D 15/28
[52] U.S. Cl. ..................... 346/136; 226/76; 226/96; 242/182; 271/34; 346/134
[58] Field of Search ............... 346/136, 134; 242/182–185; 226/76, 77, 96, 170, 171; 271/34, 33

[56] References Cited

U.S. PATENT DOCUMENTS

| | | | |
|---|---|---|---|
| 2,883,255 | 4/1959 | Anderson | 346/136 X |
| 3,084,014 | 4/1963 | Molloy | 346/134 X |
| 3,380,065 | 4/1968 | Alpert | 346/136 X |
| 3,380,682 | 4/1968 | Georgantas | 242/182 |
| 3,943,530 | 3/1976 | Mourier | 346/136 |

*Primary Examiner*—Joseph W. Hartary
*Attorney, Agent, or Firm*—Louis Etlinger; Wm. F. Porter, Jr.

[57] ABSTRACT

An X, Y plotter particularly adapted to use both cut paper and strip paper. A driven roller provides motion of the paper back and forth according to one signal. A moveable pen block containing the pen is moved transverse the path of the paper in response to the second signal, thus providing controlled motion in the X and Y directions. According to one aspect, an idler roller is provided parallel to the driven roller around which an endless belt is disposed to be driven in combination with the drive roller by two pairs of rows of sprockets on the driven roller adapted to mate with holes provided therefor in the belt. Cut paper temporarily attached to the belt with drafting tape or the like is moved beneath the pen for plotting purposes. The inner row of sprockets is adapted for engaging holes in strip paper for moving it beneath the pen. According to another aspect, a pair of supply/takeup driven rollers are positioned with the driven roller therebetween with a single vacuum chamber divided into two compartments for receiving respective loops on either side of the driven roller. In the preferred embodiment, the two vacuum chamber portions are disposed such that the respective loops are substantially at right angles to one another.

6 Claims, 9 Drawing Figures

X, Y PLOTTER

BACKGROUND OF THE INVENTION

The present invention relates to X, Y plotters and, more particularly, to an X, Y plotter combining both cut paper and strip paper operation in one device and, additionally, incorporating vacuum columns for strip paper loops which are oriented at right angles to one another.

X, Y plotters are well known in the art. In early versions, a rectangle of cut paper was placed on a flat surface and a pen was moved over the surface by a pair of motors responsive to X and Y signals, respectively. One motor was connected to drive a pen block holding the pen along a first track and the second motor was connected to drive the first track along a second track set at right angles to the first track.

Such flat-surfaced X, Y plotters took up a lot of square footage of space (horizontally or vertically, depending on the table's orientation) for the table holding the paper where the capability for large drawings was required. Accordingly, drum or roller plotters incorporating a technique generally as shown in FIG. 1 were developed. In a drum or roller plotter, such as that generally indicated as 10, a horizontal track 12 and a driving roller 14 are mounted to a pair of side members 16 in parallel relationship. A pen block 18 holding a pen 20 is mounted on the track 12 for horizontal movement in the direction of the arrow 22. Pen block 18 is moved by a first motor 24 driven in response to one of the X, Y signals and connected to the pen block 18 by metal tape drive 26, or the like. The driving roller 14 is journal-mounted for rotation and is driven in the direction of arrows 28 by a second motor 30 in response to the other signal of the X, Y pair. The drivin9 roller 14 is positioned with respect to the pen block 18 such that the pen 20 is in contact with the surface of the driving roller 14. The driving roller 14 is further provided with a pair of rows of sprocket projections 32 adjacent respective ends of the roller 14 adapted to co-act with holes 34 in strip paper 36 disposed over the roller 14. Thus, as the driving roller 14 and pen block 18 are moved in response to the X, Y signals, the desired X, Y plot 38 is created on the strip paper 36.

To provide for an extended length of strip paper 36 and the rapid movement and reversal of direction thereof without breaking caused by sudden tensile forces, the arrangement of FIG. 2 (which is substantially identical to a technique employed with magnetic tape drive units) is employed. This technique is shown in FIG. 2. FIG. 2 is an end view of apparatus similar to that of FIG. 1 which was shown in a front elevation. The driving roller 14 is disposed between a pair of supply/takeup rollers 40. Between each supply/takeup roller 40 and the driving roller 14, a vacuum column 42 is disposed which is connected to a source of vacuum, generally indicated as 44. In operation, the paper strip, as indicated by the dotted line 36, extends from one supply/takeup roller 40 over an idler roller 46, forms a loop 48 within one vacuum column 42, passes over the driving roller 14, forms a second loop 48 in the other vacuum column 42, passes over a second idler roller 46, and onto the other supply/takeup roller 40. Appropriate means (not shown) are provided for maintaining the length of the loop 48 in each vacuum column 42 by sensing its position and using the position to control the vacuum source 44. As a consequence, sudden relative movement between the supply/takeup rollers 40 and the driving roller 14 are buffered by the loops 48 and tensile loads on the strip paper 36 are virtually eliminated.

Turning now to FIG. 3, a prior art apparatus is shown in simplified side elevation employing the technique of the apparatus of FIG. 1 to the plotting of cut paper drawings. The plotter 50 of FIG. 3 comprises a base 52 supporting a driving roller 14, horizontal track 12, and pen block 18 substantially identical to those of the plotter 10 of FIG. 1. An idler roller 54, however, is added in parallel spaced relationship to the driving roller 14 and an endless belt 56 of Mylar, or the like, containing holes for gripping by the sprocket projections 32 of the driving roller 14 is disposed about the driving roller 14 and idler roller 54 such that the endless belt 56 moves in combination with the driving roller 14. Cut paper, as indicated by the dotted line 58, is temporarily secured to the surface of the endless belt 56 with drafting tape or the like. Thus, as the endless belt 56 moves beneath the pen 20, the cut paper 58 is moved in combination with it.

As can be seen from the drawings of FIGS. 1-3 taken with the descriptions thereof hereinbefore, each of the two basic types of plotters (strip paper and cut paper) has its advantages. To secure the advantages of both according to the prior art, however, two separate plotters are required. Because of the vacuum columns 42 required for proper operation of the strip drive apparatus of FIG. 2, it is not feasible or practical to combine the two plotters of FIGS. 2 and 3 even though such a combination would be desirable and would provide many benefits.

Wherefore, it is the object of the present invention to provide a dual-mode X, Y plotter having the capability of using both strip paper and cut paper and incorporating vacuum column buffer loops in the strip paper drive train.

SUMMARY

The foregoing objective has been accomplished in the dual-mode X, Y plotter of the present invention comprising means for holding and moving a pen longitudinally along a first path in a plane in response to a first signal;

means for holding and moving cut paper in contact with the pen longitudinally along a second path orthogonal to the first path in response to a second signal; and means for holding and moving strip paper in contact with the pen longitudinally along the second path in response to the second signal.

More specifically, the plotter includes a driven roller longitudinally disposed parallel to the first path with the pen in contact with the surface thereof, the roller being rotatable in response to the second signal; and an idler roller disposed parallel to the driven roller; wherein the cut paper holding and moving means comprises a flat, endless belt wrapped around the driven roller and the idler roller and driven by the driven roller to move in combination therewith with the belt being adapted to have cut paper removeably attached to the surface thereof to be moved along the second path by the belt and the driven roller in combination in response to the second signal; and wherein the strip paper holding and moving means comprises means carried by the driven roller for gripping and pulling strip paper along the second path in combination therewith in response to the second signal.

In the preferred embodiment, the dual-mode plotter of the present invention additionally comprises first and second driven supply rollers for holding strip paper disposed in parallel to and with the driven roller therebetween; a conduit having a first end opening between the supply rollers and a second end adapted to be connected to a vacuum pump; a vacuum pump connected to the second end; and divider means disposed in the first end for dividing the first end into first and second vacuum columns adapted to receive loops of strip paper disposed, respectively between the first supply roller and the driven roller and the driven roller and the second supply roller.

To reduce the space requirements and provide access to the cut paper drive, the first and second vacuum columns are disposed such that the loops therein are substantially at right angles to one another.

To provide for a positive drive of both the cut paper and the strip paper, the strip paper gripping and pulling means comprises a pair of rows of first radial sprocket projections disposed adjacent respective ends of the driven roller and adapted to co-act with holes provided along the edges of the strip of paper; and additionally, a pair of rows of second radial sprocket projections disposed between the first projections and adjacent respective ends of the driven roller with the endless belt having holes adapted to receive and co-act with the second projections such that the belt is positively driven. Additionally, the second projections are made to be compressible into the driven roller by strip paper disposed over the second projections and engaged by the first projections.

DESCRIPTION OF THE PREFERRED EMBODIMENT

Figure 1:
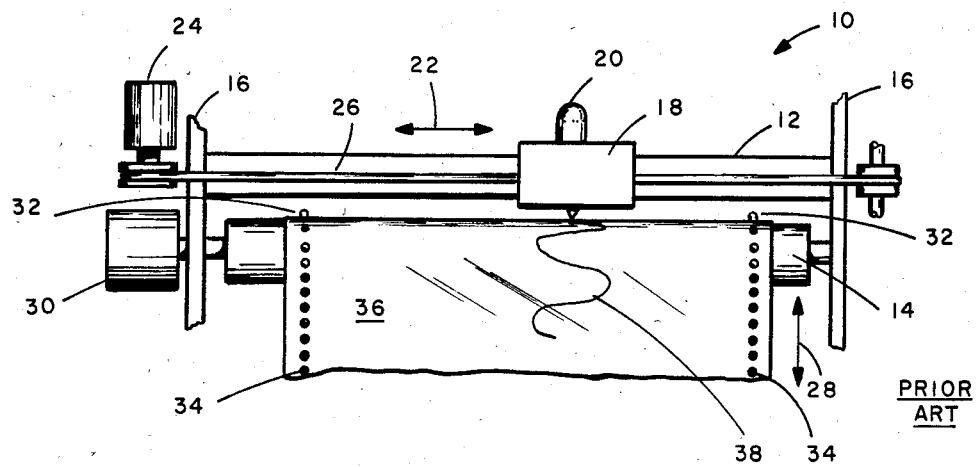
FIG. 1 is a simplified front elevation of a prior art plotter mechanism.
Figure 2:
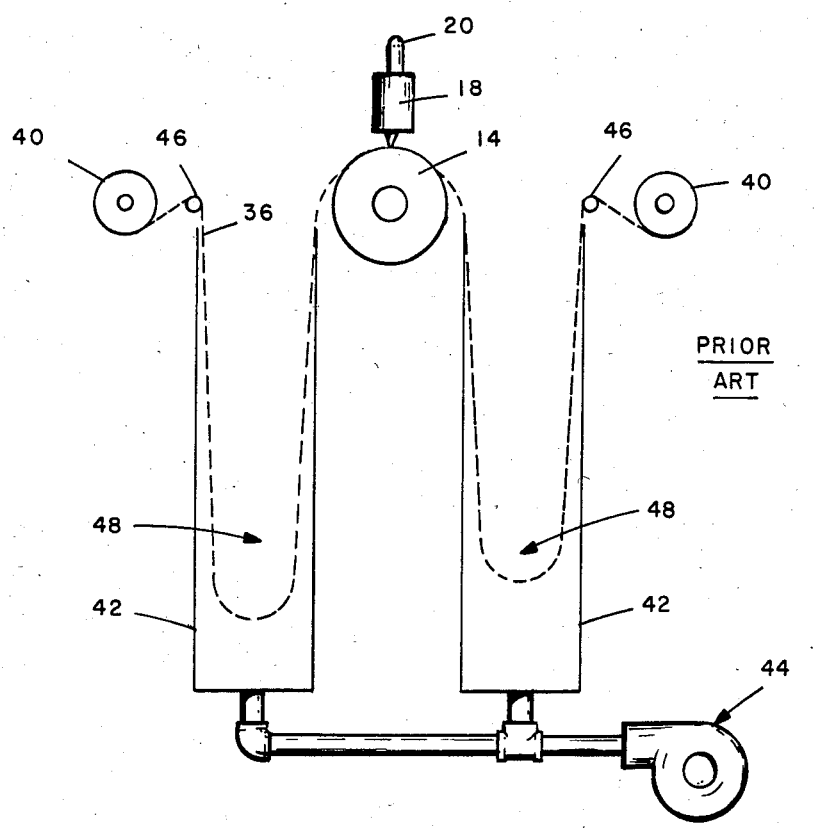
FIG. 2 is a simplified cutaway side elevation of a prior art strip paper plotter drive mechanism.
Figure 3:
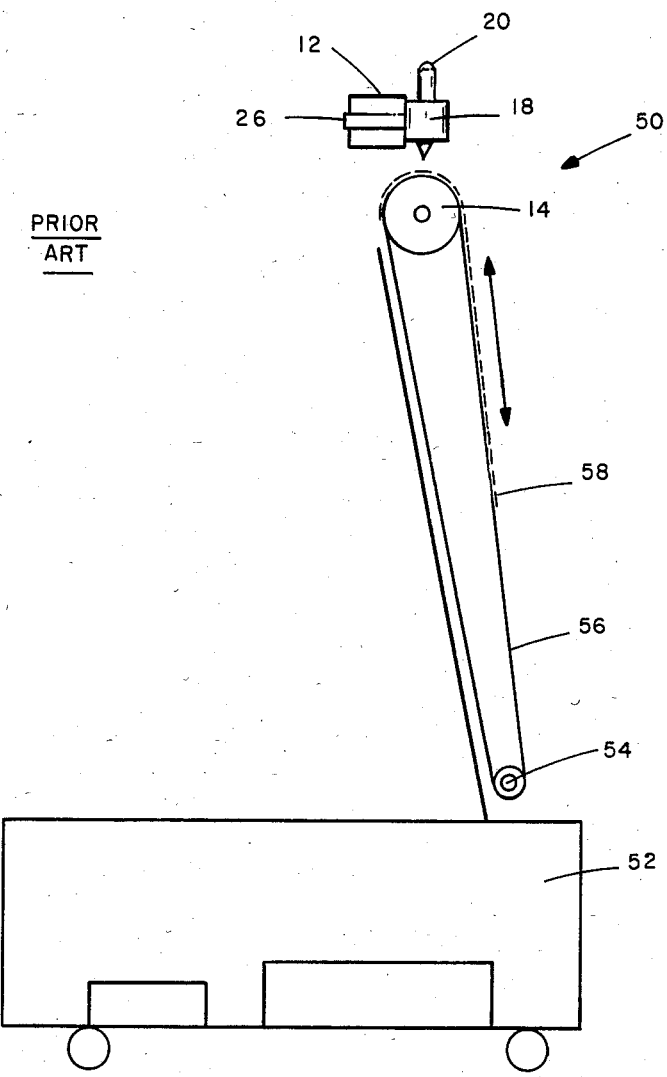
FIG. 3 is a simplified side elevation of a prior art cut paper plotter drive mechanism.
Figure 4:
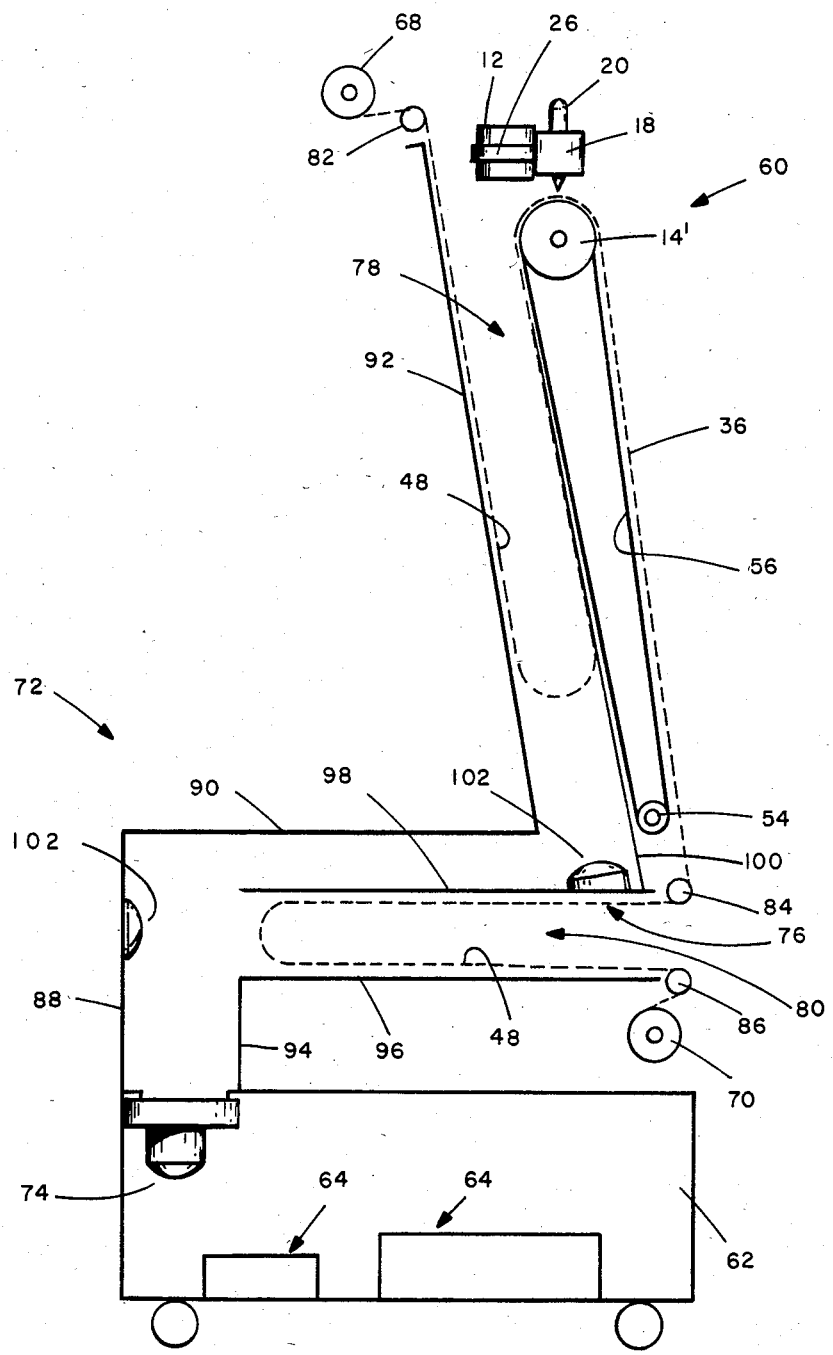
FIG. 4 is a simplified cutaway side elevation of a dual-mode plotter according to the present invention.
Figure 5:
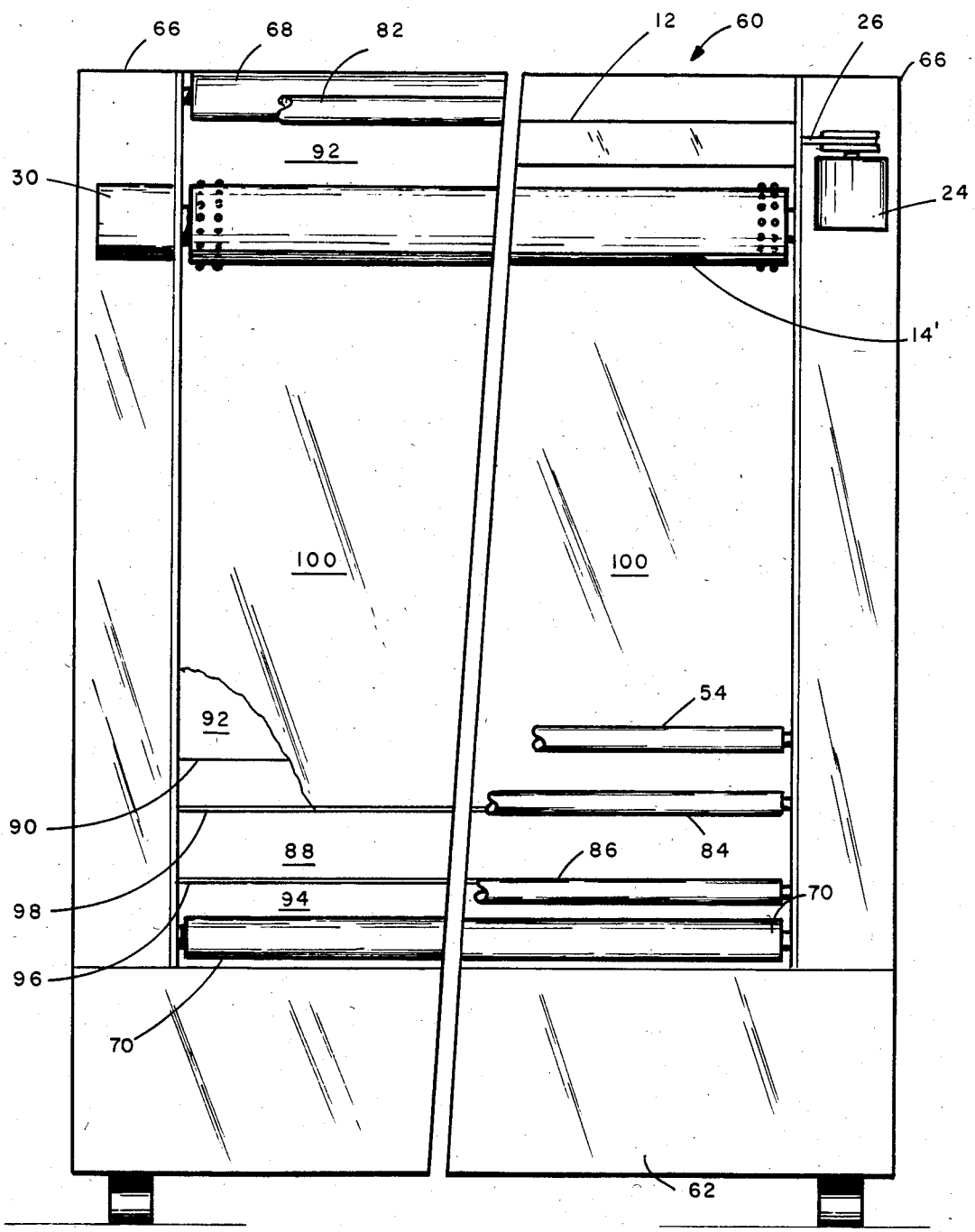
FIG. 5 is a partially cutaway front elevation of the plotter of FIG. 4.

The dual-mode plotter 60 of the present invention in its preferred and tested embodiment is shown in cutaway side elevation in FIG. 4 and in front elevation in FIG. 5. Plotter 60 (as manufactured by the assignee of this application) comprises a base 62 containing the electronics 64 employed to control the various electrical devices contained therein. A pair of parallel, spaced, vertical side members 66 are connected to the base 62. A horizontal track 12, pen block 18, pen 20, metal tape drive 26, and first motor 24 as described with respect to the apparatus of FIG. 1 are mounted to the side members 66 near the top thereof. A driving roller 14' is disposed beneath the horizontal track 12 and parallel thereto as with the driving roller 14 of FIG. 1. Driving roller 14' is driven by a second motor 30. As with the prior art apparatus of FIG. 3, an idler roller 54 is also mounted to the side members 66 parallel to the driving roller 14 and spaced therefrom with an endless belt 56 disposed about the driving roller 14' and idler roller 54. As described to this point, the plotter 60 of the present invention is substantially identical to the prior art plotter of FIG. 3.

Additionally, however, a first driven supply/takeup roller 68 is mounted to the side members 66 disposed above and behind the horizontal track 12. A second driven supply/takeup roller 70 is disposed between the side members 66 below the idler roller 54 and spaced therefrom in a manner to be described in greater detail shortly.

Between the first and second rollers 68 and between the pair of side members 66, a unique single-conduit vacuum column arrangement is created to achieve the purposes of the present invention. As can best be seen from the side view of FIG. 4, a single conduit, generally indicated as 72, is created, opening on one end between the first and second rollers 68, 70 and connected on the opposite end to a single controllable vacuum source 74. A divider, generally indicated as 76, is disposed in the end of the conduit adjacent the rollers 68, 70 to create two adjacent vacuum column portions 78 and 80 which are substantially at right angles to one another. By the addition of idler rollers 82, 84, and 86 positioned as shown, a unique paper path is created, to be described in greater detail shortly, which provides for both cut paper and strip paper operation with the inclusion of vacuum supported loops as was the object of the invention.

More particularly, the single conduit 72 is formed from the interconnected panels 88, 90 and 92 which extend from the base 62 to the first supply/takeup roller 68 in combination with the panels 94 and 96 which extend from the base 62 to the second driven supply/takeup roller 70. As can be seen in FIG. 4, the panels, which extend between the vertical side members 66 and are interconnected one to another, form a continuous path comprising vertical panels 88 and 94 which are in parallel spaced relationship, horizontal panels 90 and 96 which are also in parallel spaced relationship and panel 92 which is in a generally vertical direction (being in the above-mentioned commercial embodiment inclined backwards from the vertical at 15°). The divider 76 comprises a horizontal panel 98 disposed between panels 90 and 96 and parallel thereto connected to panel 100 which is in parallel spaced relationship to panel 92, thereby forming the two vacuum column portions 78 and 80 between panels 92, 100 and 98, 96, respectively.

As further shown in FIG. 4, idler roller 82 is placed adjacent the end of panel 92 closest to the first roller 68 while idler rollers 84 and 86 are placed adjacent the outer ends of panels 96 and 98. As thus arranged, it can be seen that the strip paper, as indicated by the dotted line 36, extends along a path from first roller 68 around idler roller 82, forms a loop 48 within the first vacuum column portion 78, passes over the driving roller 14', passes across the face of the endless belt 56, past the idler roller 54, around idler roller 84 and into the second vacuum column portion 80 where a second loop 48' is formed, from thence around idler roller 86 to the second roller 70. With the strip paper 36 removed, the face of the endless belt 56 is completely exposed and accessible for attachment of cut paper thereto in the manner of the apparatus of FIG. 3.

It should be noted that as a result of the above-described configuration, the two loops 48 of the strip paper 36 are disposed substantially at right angles to one another. This unique arrangement provides numerous advantages, including a substantial space/size savings in the overall plotter dimensions, a requirement for fewer components, and access to the endless belt during cut paper operation. To control the length of the loops 48 within the vacuum column portions 78, 80, two ultrasonic sensors 102 are employed in a manner more fully described in co-pending application, Ser. No. 6,536,589 filed Sept. 28, 1983, entitled "Solar Paper Handling System" by Ki Lam and Howard Siu, which is also assigned to the assignee of this application.

Figure 6:
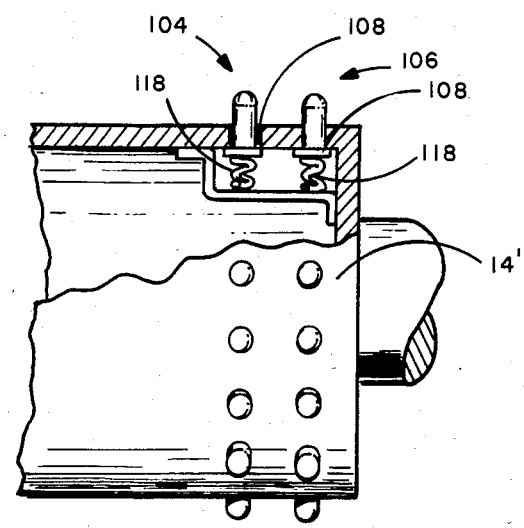
FIG. 6 is a partially cutaway detailed drawing of one end of the drive roller as employed in the present invention.
Figure 7:
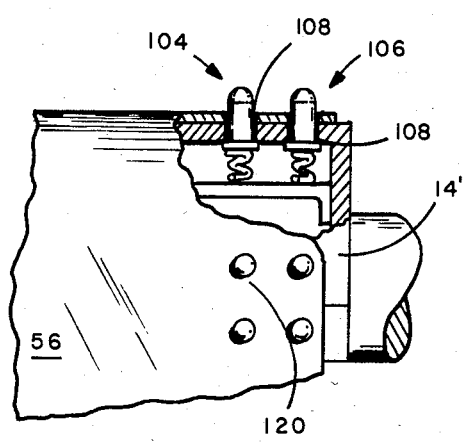
FIG. 7 is a drawing of the end of the drive roller of FIG. 1 showing the method for engagement of the endless belt thereto.
Figure 8:
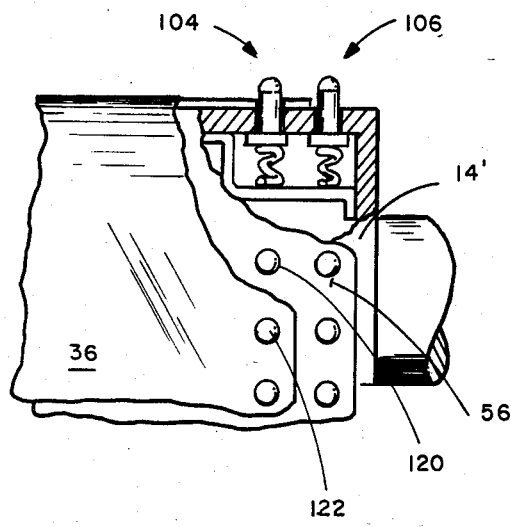
FIG. 8 is a drawing showing the roller of FIGS. 6 and 7 with the sprocket projection for the endless belt depressed by strip paper disposed thereover and in engagement with the outer row of sprocket projections.
Figure 9:
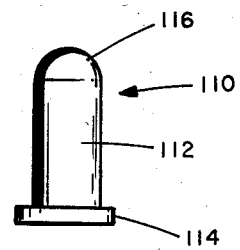
FIG. 9 is a detailed drawing of one of the sprocket members used in the roller of FIGS. 6–8.

Turning now to FIGS. 6-9, the driving roller 14' as employed in the preferred and tested embodiment of the present invention as manufactured by the assignee of this application is shown in greater detail. FIGS. 6-8 show one end of the roller 14'. The opposite end of the roller 14' is substantially identical thereto. Each end of the roller 14' is provided with two rows of radial sprocket projections designated as 104 and 106, respectively. For convenience, the sprocket projections 104 will be referred to as the "inner sprocket projections" while the sprocket projections 106 will be referred to as the "outer sprocket projections". The driving roller 14' is hollow and has a plurality of bores 108 therethrough which are equally spaced, opposite, and parallel at each end of the roller 14'. Through each of the bores 108, a sprocket member 110, as shown in detail in FIG. 9, is inserted. Each sprocket member 110 has a cylindrical body 112 adapted to slideably fit within the bore 108, a shoulder portion 114, to keep the sprocket member 110 from passing outward through the bore 108, and a smoothly curved nose portion 116 to aid in the co-active relationship between the holes of the endless belt 56 and the strip paper 36. A spring 118 (suitably supported) is positioned for urging each sprocket member 110 to its radially outward extended position as shown in FIG. 6.

As shown in FIG. 7, the endless belt 56 is provided with two rows of matching holes 120 adapted to co-act with both the inner and outer sprocket projections 104, 106 such that the endless belt 56 is gripped and held by both rows of projections 104, 106 as the driving roller 14' rotates, thus moving the endless belt 56 in combination therewith in a positive manner.

As shown in FIG. 8, when strip paper 36 is employed, matching holes 122 in the strip paper 36 co-act with the inner sprocket projections 104 to grip and pull the paper 36 in combination with the driving roller 14'.

Wherefore, having thus described my invention, I claim:

1. A dual-mode X, Y plotter comprising:
   (a) means for holding and moving a pen longitudinally along a first path in a plane in response to a first signal;
   (b) means for holding and moving cut paper in contact with said pen longitudinally along a second path orthagonal to said first path in response to a second signal;
   (c) means for holding and moving strip paper in contact with said pen longitudinally along said second path in response to said second signal;
   (d) a driven roller longitudinally disposed parallel to said first path and with said pen in contact with the surface thereof, said roller being rotatable in response to said second signal; and,
   (e) an idler roller disposed parallel to said driven roller; and wherein:
      (i) said cut paper holding and moving means comprises a flat, endless belt wrapped around said driven roller and said idler roller and driven by said driven roller to move in combination therewith, said belt being adapted to have cup paper removeably attached to the surface thereof to be moved along said second path by said belt and said driven roller in combination in response to said second signal;
      (ii) said strip paper holding and moving means comprises means carried by said driven roller for gripping and pulling strip paper along said second path in combination therewith in response to said second signal, and
      (iii) said strip paper gripping and pulling means comprising a pair of rows of first radial sprocket projections disposed adjacent respective ends of said driven roller and adapted to co-act with holes provided along the edges of the strip paper and a pair of rows of second radial sprocket projections disposed between said first projections and adjacent respective ends of said driven roller, said endless belt having holes adapted to receive and co-act with both said first and second projections whereby said belt is positively driven.

2. The dual-mode plotter of claim 1 and additionally comprising:
   (a) first and second driven supply rollers for holding strip paper disposed in parallel to and with said driven roller therebetween;
   (b) a conduit having a first end opening between said supply rollers and a second end adapted to be connected to a vacuum pump;
   (c) a vacuum pump connected to said second end; and,
   (d) divider means disposed in said first end for dividing said first end into first and second vacuum columns adapted to receive loops of strip paper disposed, respectively, between said first supply roller and said driven roller and said driven roller and said second supply roller.

3. The dual-mode plotter of claim 2 wherein:
said first and second vacuum columns are disposed such that said loops therein are substantially at right angles to one another.

4. The dual mode plotter of claim 2 further comprising sonar detection means in each of said vacuum columns for detecting the positions of the loops disposed in each of said vacuum columns.

5. An X, Y plotter comprising:
   (a) means for holding and moving a pen longitudinally along a first path in a plane in response to a first signal;
   (b) means for holding and moving cut paper in contact with said pen longitudinally along a second path orthogonal to said first path in response to a second signal;

(c) means for holding and moving strip paper in contact with said pen longitudinally along said second path in response to said second signal, said latter means including, (d) a driven roller longitudinally disposed parallel to said first path with said pen in contact with the surface thereof, said roller being rotatable in response to said second signal;

(e) first and second driven supply rollers for holding strip paper disposed in parallel to and with said driven roller therebetween;

(f) a conduit having a first end opening between said supply rollers and a second end adapted to be connected to a vacuum pump;

(g) a vacuum pump connected to said second end; and, (h) divider means disposed in said first end for dividing said first end into first and second vacuum columns adapted to receive loops of strip paper disposed, respectively, between said first supply roller and said driven roller and said driven roller and said second supply roller, said strip paper holding and moving means comprising a pair of rows of first radial gripping means disposed adjacent the respective ends of said driven roller and adapted to coact with holes provided along the edges of the strip paper and a pair of rows of second radial gripping means disposed between said first pair of rows and adjacent the respective ends of said driven roller, said means for holding and moving cut paper having third gripping means adapted to coact with both said first and second gripping means, whereby said means for holding and moving cut paper is positively driven.

6. The X, Y plotter of claim 5 wherein:

said first and second vacuum columns are disposed such that said loops therein are substantially at right angles to one another.

* * * * *